United States Patent [19]

Tabor

[11] Patent Number: 4,681,130
[45] Date of Patent: Jul. 21, 1987

[54] COMBINED PRESSURE REGULATED AND CHECK VALVE

[75] Inventor: Elhanan Tabor, Carmiel, Israel
[73] Assignee: "AR-KAL" Plastics Products (1973), Beit-Zera, Israel
[21] Appl. No.: 906,162
[22] Filed: Sep. 11, 1986
[51] Int. Cl.[4] .................................... F16K 31/122
[52] U.S. Cl. .................................. 137/220; 137/219
[58] Field of Search ............................ 137/219, 220

[56] References Cited

U.S. PATENT DOCUMENTS

| | | | |
|---|---|---|---|
| 2,071,969 | 2/1937 | Diescher | 137/220 |
| 3,134,394 | 5/1964 | Ohta | 137/220 |
| 3,515,165 | 6/1970 | Zadoo | 137/220 |

Primary Examiner—Gerald A. Michalsky
Attorney, Agent, or Firm—Ostrolenk, Faber, Gerb & Soffen

[57] ABSTRACT

A combined pressure-regulated and check fluid flow valve is disclosed which is adapted to be installed directly on the pipeline and serve also as a protection against water hammer in case of sudden pressure failure in the line. The valve is installed within a housing configured as a uniform extension of a pipeline to which the valve is connected. The structure consists mainly of a freely reciprocable differential piston associated with a fixed differential cylinder, a freely reciprocable valve member at the inlet side and a freely reciprocable piston at the outlet side of the housing.

2 Claims, 4 Drawing Figures

COMBINED PRESSURE REGULATED AND CHECK VALVE

BACKGROUND OF THE INVENTION

The present invention relates to fluid control valves, and more particularly to hydraulically controlled in-line valves.

Valves of the type referred to are usually mounted directly on the fluid line, however, with an interruption of the streamlined pipe configuration; a special fitting is installed for the purpose of mounting thereon the actuating device, be it a hydraulic or a solenoid operated control unit.

These non-streamlined mountable valves suffer an inherent disadvantage in that they cause turbulent, disturbed flow of fluid and entail the accumulation of dirt which, in the long run, affects the operation of the valve. Furthermore, because of their unbalanced construction, excessive wear and friction forces become present and cause unreliable operation.

It is therefore the major object of the invention to provide a fully balanced, streamlined in-line fluid flow control valve.

It is a further object of the invention that the valve according to the invention be provided with unidirectional self-closing means, converting same into a check valve in case of pressure breakdown at the upstream end of the line. It is a still further object of the invention that in such cases of pressure breakdown of the line and abrupt self-closing of the valve, the entailed "water hammer" effect should be reduced as far as possible.

SUMMARY OF THE INVENTION

According to the invention there is provided a combined pressure-regulated and check fluid flow valve comprising an inlet port, an outlet port, and pressure-control means for actuating the valve. The valve is provided with an inlet port section and an outlet port section, coupled to each other to form a valve housing configured as a uniform extention of a pipeline to which the valve is connected. A freely reciprocable, generally cup-shaped valve member and associated valve seat are provided in the inlet port section for closing the valve against the incoming fluid flow. A first, freely-reciprocable differential piston member is provided downstream of the valve member, and having first, second and third piston portions of gradually decreasing cross-sections, the third portion being extended to project into the hollow of and to abut against an inner portion of the valve member. A first, fixed cylinder member having first, second, and third inner cylinder portions is provided for slidably supporting the respective portions of the first piston member, and an outer cylinder portion for the cup-shaped portion of the valve member. A second, freely reciprocable piston member is provided downstream of the first piston member and comprising an extended portion upstream thereof adapted to abut against the said first piston member. A second, fixed cylinder member is slidably supporting the second piston member. Further provided are first passage means for introducing the actuating control pressure into the said first cylinder downstream of the first piston portion, and second passage means for relieving pressurized fluid from the first cylinder downstream of the second piston portion.

BRIEF DESCRIPTION OF THE DRAWINGS

The invention will be more fully understood in the light of the ensuing description of a preferred embodiment thereof, given by way of example only with reference to the accompanying drawings, wherein.

DETAILED DESCRIPTION OF THE PREFERRED EMBODIMENT

Figure 1:
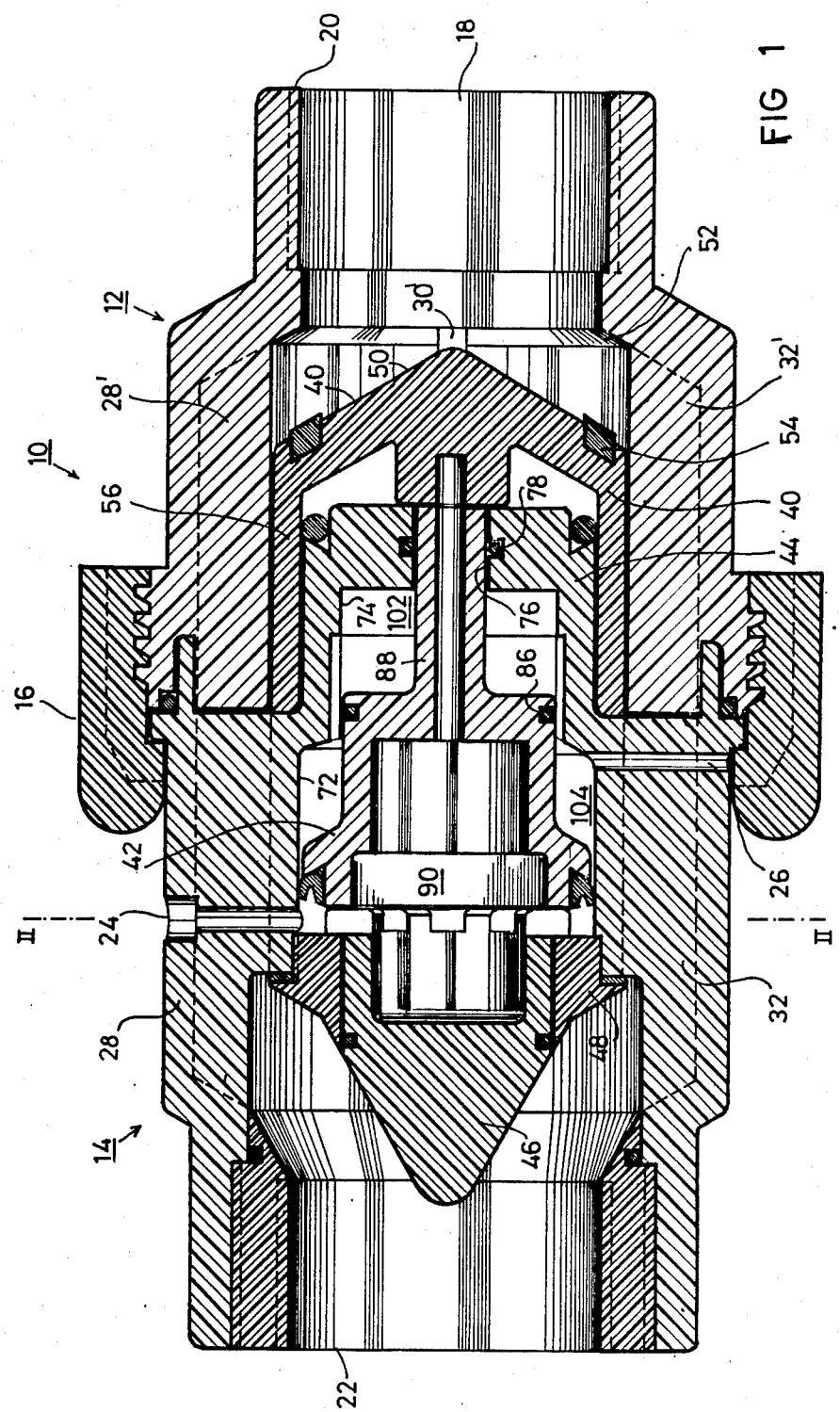
FIG. 1 is a longitudinal cross-section of the valve according to the present invention.
Figure 2:
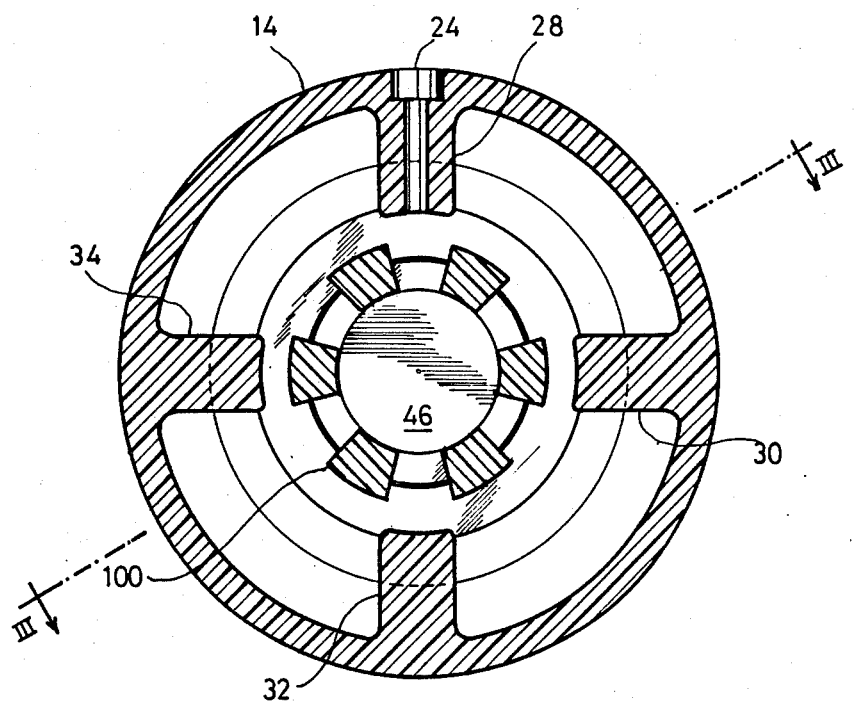
FIG. 2 is a section taken along line II—II of FIG. 1.

Valve 10 of FIG. 1 comprises an inlet port section generally denoted 12, an outlet port section 14, and a coupling ring 16 for connecting the two sections together into a complete, self-contained valve housing structure. In further detail, the inlet port section 12 comprises inlet 18 with means, such as screw thread 20, for directly installing the valve to the fluid pipeline (not shown). The outlet portion 14 comprises an outlet coupling opening 22 and is provided with a passageway 24 for introducing pressurized fluid control commands from a hydraulic control device (not shown). A drain passage 26 is provided as shown. Both sections 12 and 14 are provided with, say, four elongated, inwardly directed ribs 28-34, as shown in FIG. 2 (and aligned ribs 28'-34' at the section 12), for carrying the main valve components; these are as follows (best seen in FIGS. 3 and 4): Valve member 40; a first, slidable piston member 42; a first, fixed cylinder 44; a second, slidable piston 46; and a second, fixed cylinder 48 —all being in axial alignment with respect to each other along the flow direction between the inlet and outlet of the valve.

Valve member 40 is generally cup-shaped having a streamlined, bullet-like end surface 50 facing the incoming fluid flow through the inlet 18. The inlet section 12 is provided with a valve seat surface 52, configured to fit against a valve ring or gasket 54 of the valve 40, as shown. Cylindrical wall portion 56 of the valve 40 extends backwards in the downstream direction, defining a hollow space 58 thereinside (see FIG. 3). Inner surface 60 is slidably guided around an outer portion 62 of the fixed cylinder 44, with a suitable seal in the form of O-ring 64. Valve 14 further comprises a central projection 66 defining an abutment surface 68 and an inner hollow space 70.

Figure 3:
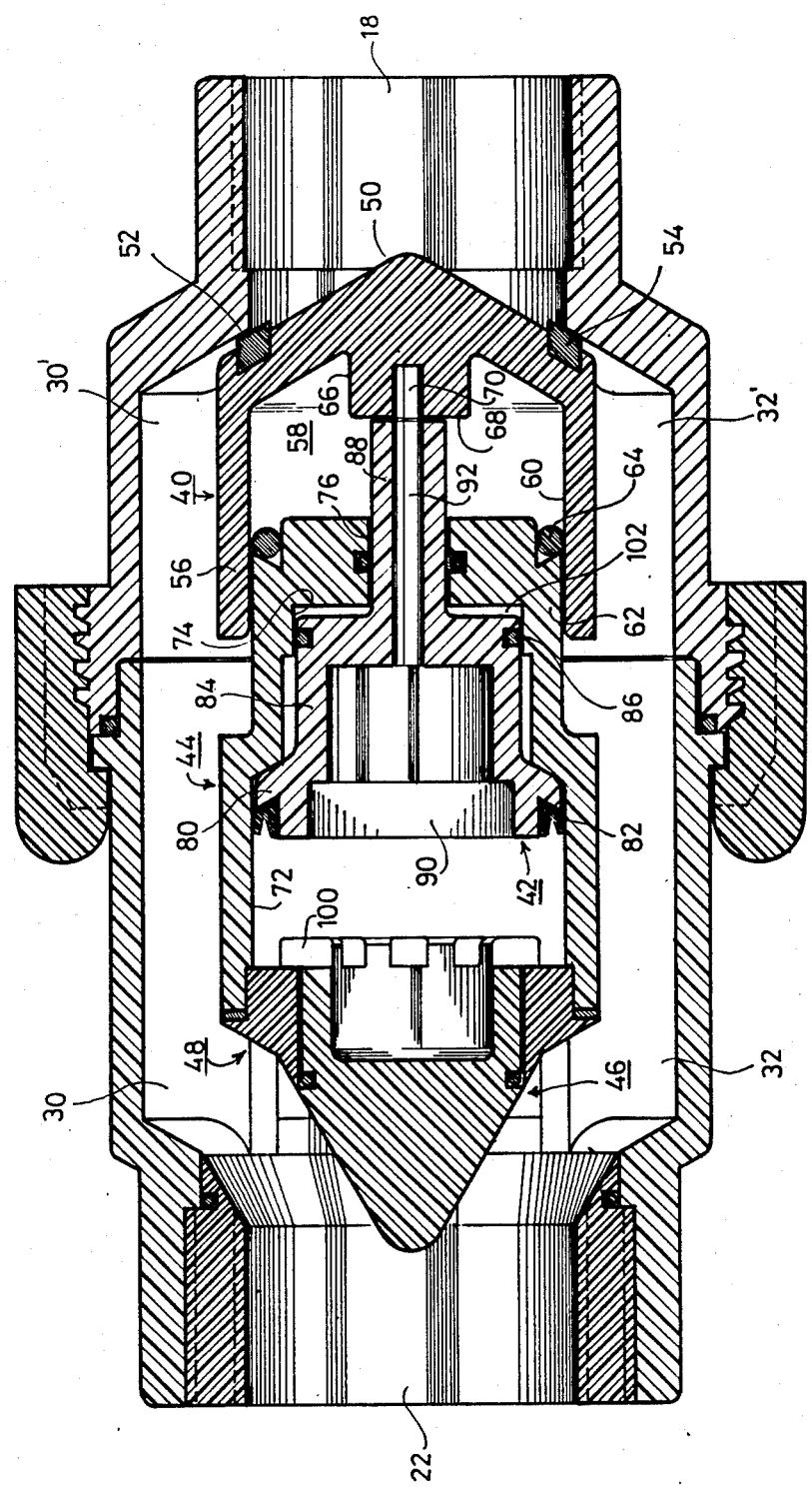
FIG. 3 is a section taken along line III—III of FIG. 2 of the valve in a second stage of operation.
Figure 4:
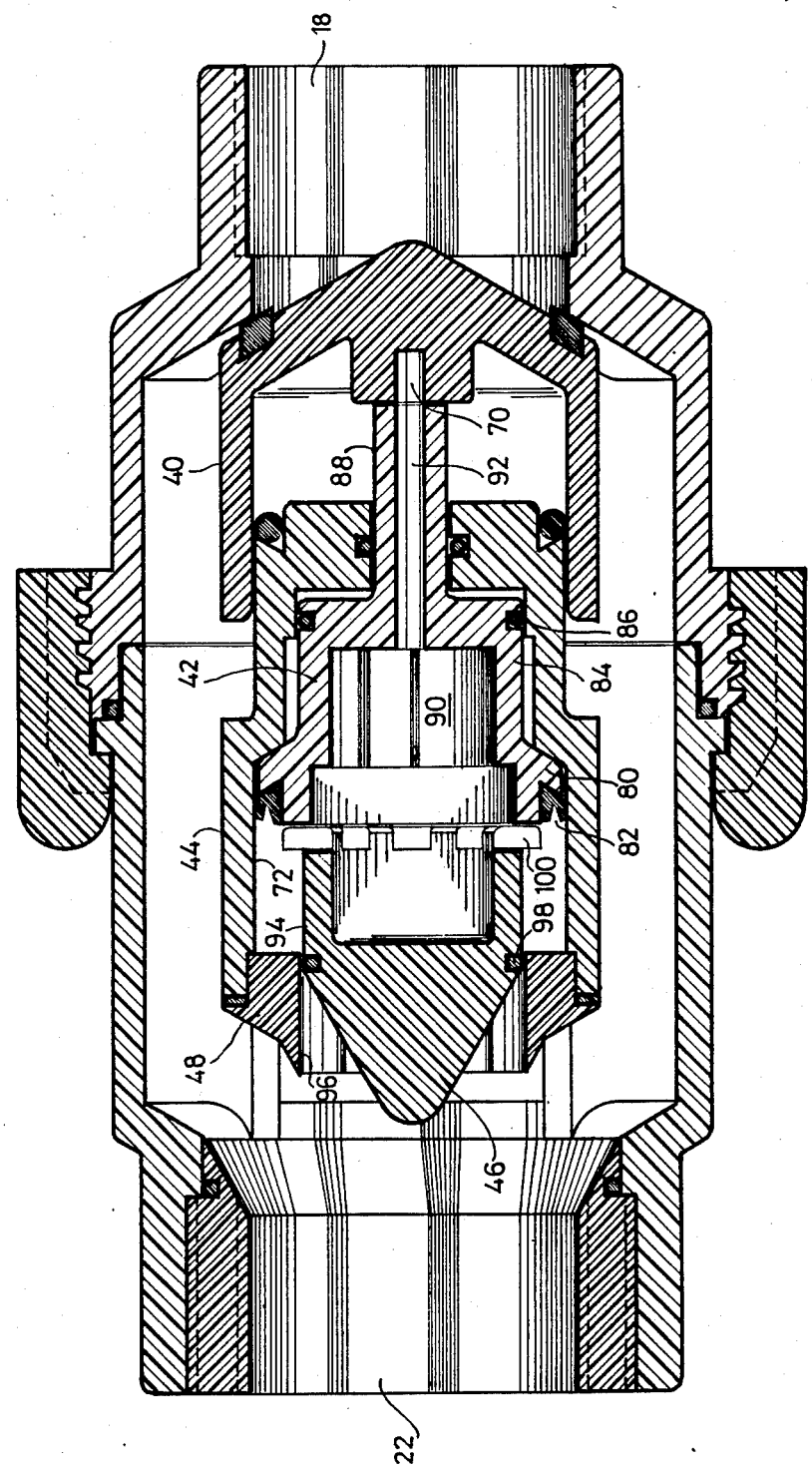
FIG. 4 is a section similar to FIG. 3 showing the valve in a third stage of operation.

It is thus noted that valve member 40 is reciprocable between an open position shown in FIG. 1 and the closed position of FIGS. 3 or 4.

Fixed cylinder member 44 defines thereinside a first cylinder portion 72, a second cylinder portion 74, and a third cylinder portion 76, with seal 78.

The piston 42 includes a first piston or plunger portion 80 with seal or gasket 82 cooperating with surface 72 of the cylinder 44; and a second piston portion 84 in sealed sliding contact with the said surface 74 of the cylinder 44, provided with seal 86.

An extended projected portion 88 of the piston 42 reaches through the bore 76 up to an abutment contact with surface 68 of the valve 40.

The piston 42 is hollow, namely it comprises a space 90 extended by bore 92 which becomes aligned with the bore 70 of the valve member 40.

It will be thus noted that piston 42 is of the differential type, having three gradually-decreasing cross-sectional active areas defined by the surfaces 72, 74, and 76 of the cylinder 44.

The downstream end portion of the cylinder 44 constitutes a mounting for the second, fixed cylinder 48 with associated piston 46. The piston 46 is bullet-shaped, pointed in the downstream direction and comprises a piston surface 94 cooperating with surface 96 of the cylinder 48 intermediate gasket 98 (FIG. 4). The piston 46 is hollow and provided with a flanged shoulder 100, preferably of a slotted structure as shown (see FIG. 2).

Three modes of operation of the valve 10 will now be described. In the position shown in FIG. 1, bearing in mind the centrally-located mounting of the valve components supported by the rib structure, the valve is in its open position, namely, fluid may freely flow around the "floating" structure of the valve from the inlet to the outlet thereof.

For closing the valve, pressure will be admitted through the passage 24, acting on the largest cross-sectional area of the piston 42 to displace it, together with the valve member 40 to close the valve as shown in FIG. 3. The control pressure will act on both left-hand sides of the piston 42 and the inner cross-section of the space 58, reached thereinto through the passage 92. Both members will therefore act as a pair of pistons connected in tandem. This will practically double the effective force to assure the safe closure of the valve against the network pressure.

It will be noted that in this position the second portion 84 of the piston 42 is partly inserted into the now completely sealed space 102 defined by the cylindrical portion 74, thus constituting an air-cushion or trap acting against abrupt closure of the valve (see below).

It will be further noted that extra liquid will become evacuated through the drain 26 provided for that purpose. For opening the valve, pressure will be relieved from the interior of the cylinder 44 through the passage 24 and the valve members 42 and 40 will resume their relative positions shown in FIG. 1 under the pressure of the incoming liquid acting on the valve member 40.

The third mode of operation will now be described with reference to FIG. 4. As known, in the event of an abrupt pressure drop occuring in a pipeline, such as in case of a pumping failure, it is advisable to provide self-acting unidirectional or check-valves to avoid the flowing of all the liquid already pumped back into the well and wasting thereby all the energy that has been invested.

The valve according to the invention will act as a check valve under the above conditions —namely a significant pressure drop upstream thereof —in the following manner: The second piston 46 will become released from the pressure acting in the downstream direction and the backflow pressure of the complete pipeline contained downstream of the valve will cause the displacement of the piston in the right-hand, closing direction of the valve. The three members, namely, the piston 46, piston 42, and valve member 40, will move in unison to the right towards the closing position shown in FIG. 4. This movement will however not be uncontrolled or abrupt, but will become cushioned by an enclosed space marked 102 in FIG. 1, acting as an air chamber to avoid the sometimes disastrous water hammer effect that may cause grave damage to the complete pipeline network.

It is thus established that by the most neat, streamlined, compact and simple construction of the valve, an effective solution is attained to both respects of valves operation in general, namely as control means of a pipeline and as safety means under the appropriate conditions.

Those skilled in the art will readily appreciate that various changes, modifications, and variations may be applied without departing from the scope of the invention as defined in and by the appended claims.

What is claimed is:

1. A combined pressure-regulated and check fluid flow valve comprising an inlet port, an outlet port, and pressure-control means for actuating the valve, characterized by:

an inlet port section and an outlet port section, coupled to each other to form a valve housing configured as a uniform extention of a pipeline to which the valve is adapted to be connected;

a freely-reciprocable, generally cup-shaped valve member and associated valve seat provided at the inlet port section for closing the valve against the incoming fluid flow;

a first, freely-reciprocable differential piston member provided downstream of the valve member, and having first, second and third piston portions of gradually decreasing cross-sections ,the third portion being extended to project into the hollow of and to abut against an inner portion of the valve member;

a first fixed cylinder member having first, second, and third inner cylinder portions for slidably supporting the first piston member portions, respectively, and an outer cylinder portion for the cup-shaped portion of the valve member;

a second, freely-reciprocable piston member provided downstream of the first piston member and comprising an extended portion upstream thereof adapted to abut against the said first piston member;

a second, fixed cylinder member slidably supporting the second piston member;

first passage means for introducing the actuating control pressure into the said first cylinder downstream of the first piston portion; and second passage means for relieving pressurized fluid from the first cylinder downstream of the second piston portion.

2. The valve as claimed in claim 1 wherein the said third cylinder and piston portions define an enclosed space serving an air-cushion when the first piston member is displaced in the upstream direction.

* * * * *